Aug. 30, 1932. A. KONOFF Re. 18,585

EYE SET

Original Filed March 17, 1926

INVENTOR.
Alexander Konoff
BY
L. Sanford Handel
ATTORNEYS.

Reissued Aug. 30, 1932

Re. 18,585

UNITED STATES PATENT OFFICE

ALEXANDER KONOFF, OF NEW YORK, N. Y., ASSIGNOR, BY MESNE ASSIGNMENTS, TO MARGON CORPORATION, OF NEW YORK, N. Y., A CORPORATION OF NEW YORK

EYE SET

Original No. 1,621,072, dated March 15, 1927, Serial No. 95,198, filed March 17, 1926. Application for reissue filed October 12, 1927. Serial No. 225,825.

This invention relates to an improvement in eye sets for dolls and similar toys, and particularly to the manner of constructing the eye set and attaching it within the doll's head or other toy.

An object of the invention is to provide an eye set so constructed that it may be quickly and easily attached in position within the doll's head and so that when attached the eyes themselves will be suitably yieldably supported for uniformly efficient performance of their every function.

A further object is to provide an eye set including a supporting carrier for the eyes which carrier is assembled with the eyes preparatory to placing the eyes in operative position and which when the eyes are in operative position may be easily and efficiently connected with the dolls' head to serve in maintaining the eyes in operative position.

A more detailed object is to provide a supporting carrier for the eyes including parts to resiliently support the eyes for oscillatory movement in the usual manner, and including also a pair of relatively movable attaching members adapted, after the carrier is in proper operating position, to be manually moved for impinging against or biting into the material of the doll's head for thereafter permanently and rigidly holding the carrier in its operative position.

A further detailed object is to provide a simple and efficient form of attaching member.

A further detailed object is to provide an improved type of resilient supporting means for the eyes.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Figure 1:
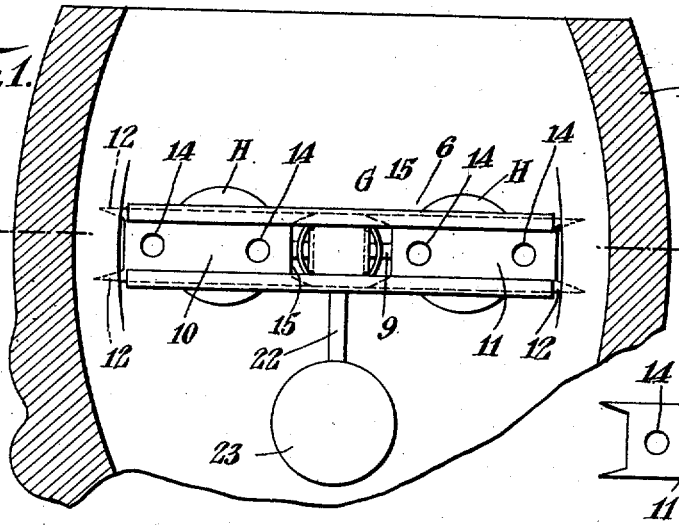
Fig. 1 is a rear elevational view of an eye set constructed in accordance with this invention, said set being shown as it appears when in position within a doll's head, the doll's head being shown in vertical section.
Figure 6:
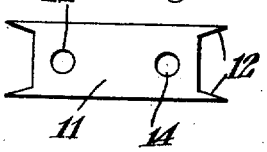
Fig. 6 is a detail elevational view of one of the attaching members employed.

Referring to the drawing for describing in detail the structure therein shown the reference character L indicates a doll's head, it being understood that although a doll's head is referred to herein nevertheless this invention is equally adaptable for use with other toys in which moving eyes are utilized. The doll's head has the usual eye sockets 2 and 3 at opposite sides of the nose portion 4, and beyond the eye sockets has the usual cheek portions 5 and 6.

The supporting carrier comprised in this invention is indicated generally by the reference character G. It consists of a body portion 7 which is adapted to extend horizontally across the interior of the doll's head from cheek portion to cheek portion and which has an eye carrying portion 8 intermediate its length adapted to extend forwardly of the body portion for directly supporting the cross rod 9 at the opposite ends of which are mounted the eyes H—H.

Figure 4:
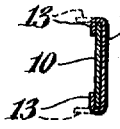
Fig. 4 is a detail sectional view taken upon the plane of line IV—IV of Fig. 2.

The body portion 7 of the carrier G is made from an elongated piece of sheet metal bent into channel form, as most clearly illustrated in Fig. 4, and within the channel of this part is arranged a pair of attaching members 10 and 11.

Figure 2:
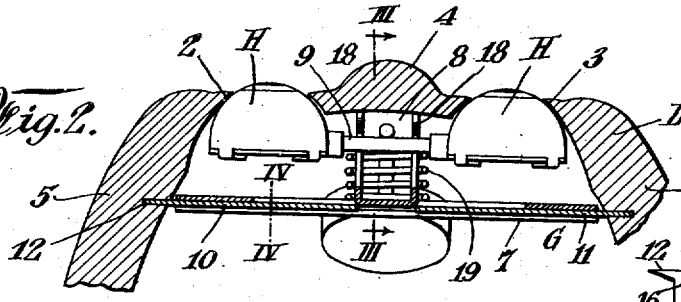
Fig. 2 is a horizontal sectional view taken substantially upon the plane of line II—II of Fig. 1.

The attaching members 10 and 11 are longitudinally slidable along the channel 7 and their outer end portions are provided with tangs 12—12 which, when the attaching members are slid outwardly beyond the opposite ends of the body portion, sink into the cheek portions 5 and 6 of the doll's head, as clearly illustrated in Figs. 1 and 2.

Figure 5:
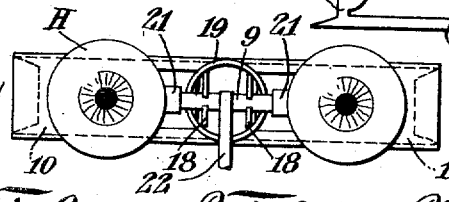
Fig. 5 is a front elevational view of the eye set detached from the doll's head.
Figure 3:
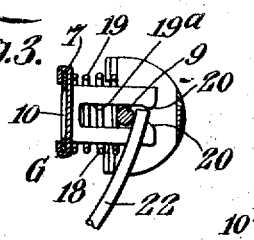
Fig. 3 is a vertical transverse sectional view through the eye set, said section being taken substantially upon the plane of line III—III of Fig. 2.

Before the application of this eye set into the doll's head the attaching members 10 and 11 are of course in their innermost or normal positions, as indicated by the dotted lines in Fig. 5, and their movement outwardly for driving the tangs 12 into embedded relation within the cheek portions of the doll's head is not performed until after the body portion has been moved into the proper and correct position for disposing the eyes H—H into their appointed co-operative relationship with the eye sockets 2 and 3, as will be readily understood by those skilled in this art.

Since it is intended that when the attaching members have been once driven outwardly into the cheek portions of the doll's head they shall thereafter maintain their positions for continuing to properly support the eyes, the attaching members are fitted so tightly within the channel provided within the body portion 7 that retrogressive movement of the attaching members will not be likely.

Here it may be explained that a proper tightness of fit of the attaching members within the channel of the body portion is readily afforded during the manufacture of the eye set by placing the attaching members in their inner positions within the channel before the channel is fully completed, that is during the time while the marginal flange portions as 13 are outstanding, as seen by the dotted lines in Fig. 4, and by then bending said flange portions downwardly about the attaching members. The frictional grip thus provided upon the attaching members will hold the attaching members firmly in any position into which they are forcefully moved along the channel. And it will be understood in this connection that a suitable forcing tool is of course employed for moving the attaching members outwardly along the channel after the body portion 7 has been properly positioned within the doll's head.

Since it occasionally happens that an eye set must be removed from a doll's head, after having been once attached, it is desirable to provide the attaching members with suitable openings as 14—14 therethrough into which a tool may be engaged for forcing the attaching members toward each other upon occasion. These same openings may be utilized for engagement by the tool to drive the attaching members outwardly if desired but usually it is preferable to engage the tool against the inner end edges as 15—15 of the attaching members for this purpose.

The opposite ends of each of the attaching members are preferably identical since by this means the workman in assembling the eye set is not called upon to distinguish between the different ends of the attaching members.

Figure 7:
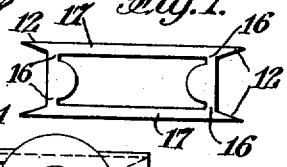
Fig. 7 is a similar detail view of one of the attaching members, and illustrating a modified form thereof.

By reference to the modification seen in Fig. 7 it is pointed out that if desired the attaching members may be so formed as to provide several points of weakness as at 16—16 connecting together two longitudinally extending rod like portions 17—17, the tangs 12—12 being directly at the opposite ends of these rod like portions. The purpose of this arrangement is to enable the attaching member to become more or less distorted out of its original shape if such distortion is desirable during the time while the attaching member is being forced into the material of the doll's head. If for instance one of the tangs 12 should engage the material of the doll's head before the other tang, or should meet an unexpectedly resistant obstacle in the material of the doll's head, the weakened portions 16—16 would enable the attaching member to bend upon said weakened portions and allow the other tang to move forward until the resistance of both tangs is substantially equal whereupon the further outward movement of the attaching member would be uniform as regards both tangs.

When the body portion 7 has been once placed in position and the attaching members have been moved outwardly said body portion will thereafter be rigid with the doll's head.

The eye carrying portion 8 of the carrier G may take any desired form, its essential characteristic being simply that it serves to resiliently support the cross rod 9 for holding the eyes H—H universally resiliently pressed, with a light spring pressure, against the eye sockets 2 and 3. The form of the attaching portion shown in Figs. 1 to 5 consists of a pair of bifurcated arms as 18—18 struck out from the material of the body portion 7 and bent forwardly in parallel relation spaced apart, together with a single light coil spring 19 arranged in position encircling both of said arms and having one of its ends pressing against the forward surface of the body portion 7 and having its opposite end pressing against the cross rod 9.

The cross rod 9 extends in a direction parallel with the length of the body portion 7 and is received within the bifurcation of the arms 18—18. The slots, as 19[a], provided by the bifurcation of the arms 18—18, are sufficiently wide so that the cross rod 9 has slight free play therein to thus permit an easy movement of the cross rod in all directions within said slots. The parts of each arm, at opposite sides of the bifurcations, are so shaped at their outer ends, as at 20—20, as to reduce the width of the slots 19[a] at said outer ends for preventing the accidental disconnection of the cross rod outwardly through the open ends of the slots during the handling of the eye set prior to attachment within a doll's head. The space between the portions 20—20 is slightly less than the thickness of the cross rod. The portions of the arms carrying the portions 20—20 however are slightly resilient with respect to each other so that during the assembly of the eye set the cross rod may be readily sprung into the slots by spreading the portions 20—20.

The eyes H—H may be connected with the cross rod 9 in any approved manner, it being understood that the eyes are longitudinally and rotatably adjustable upon the cross rod, as by means of sleeves 21 carried by the eyes and telescoping over the ends of the rod, as may be required to properly space and arrange the eyes for correctly mating the sockets 2 and 3. The pressure of the spring 19 against the rear side of the cross rod will at all times hold the eyes resiliently against the sockets, and the looseness of fit of the rod within the slots 19 will permit the eyes to shift more or less in one direction or the other as may be necessary to enable them to properly seat within the sockets.

Any suitable means may be employed for causing the cross rod 9 to oscillate back and forth as the doll is moved from reclining to upright position, etc., and for this purpose the drawing illustrates a pendant arm 22 fixed rigidly to the cross rod by its upper end and having a weight as 23 attached to its lower end. The gravity movements of the weight, under change of position of the doll, will oscillate the cross rod and cause the eyes to move between "open" and "closed" positions.

Figure 8:
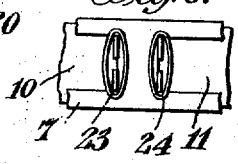
Fig. 8 is a fragmentary front elevational view of the central portion of the carrier, corresponding with the central portion of the view Fig. 5 but the eyes and their connecting rod being omitted, this view being presented to illustrate a modified form of spring device for resiliently urging the eyes to their operative positions within the eye sockets of the doll's head.

In the modification Fig. 8 the structure is the same as has already been described except that in this instance two separate springs as 23 and 24 are suggested in lieu of the single spring 19 proposed with reference to the previous figures, the two springs being arranged one surrounding each of the arms 18—18 and being for this purpose of elliptical contour.

Figure 9:
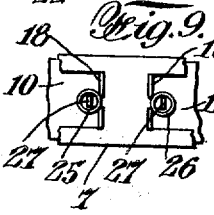
Fig. 9 is a view similar to Fig. 8 but illustrating a further form of resilient means for urging the eyes to their operative positions.

In the modification Fig. 9 the structure is also the same as in Fig. 8 except that in this instance the two separate springs, here indicated by the reference numerals 25 and 26, are smaller in size and are carried by supporting fingers 27—27 formed as parts of the arms 18—18.

Figure 10:
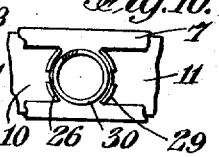
Fig. 10 is another view similar to Figs. 8 and 9 and illustrating a still further modification of the parts for resiliently supporting the eyes.

In Fig. 10 a further modification is presented of the parts for resiliently supporting the cross rod 9. In this instance the two bifurcated arms, here indicated by the reference numbers 28 and 29, are shaped to define a circular pocket between them within which a single compression spring as 30 is confined.

The functional operation of the parts shown in Figs. 8, 9 and 10 are all identical with the functions previously described with reference to the other figures.

The arms 18 may be considered also as limiting means for engaging against the inner surface of the nose portion 4 of the doll's head, as illustrated in Fig. 2, to always prevent the body portion 7 of the carrier from being moved forwardly to such a position as to too greatly compress the spring 19. In attaching the eye set within the doll head the carrier is placed within the head and moved to position with the ends of the arms 18 resting against the inner surface of the doll head, thus limiting and defining the position of the carrier with respect to the head, whereupon the attaching members 10 and 11 are forced outwardly to fix the carrier in the position determined by the arms.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. An eye set comprising a pair of eyes a cross rod extending between and connecting said eyes together, and a supporting carrier for said eyes, said carrier comprising a part by which to connect it with a doll's head and having another part constituting a pivot bearing for said cross rod, and said last mentioned part consisting of a pair of bifurcated arms spaced apart, the cross rod extending through the slots provided by the bifurcation of said arms, and said slots being open ended to permit assembly of the cross rod thereinto.

2. An eye set comprising a pair of eyes, a cross rod extending between and connecting the eyes, a supporting carrier upon which the cross rod is rotatably mounted, and said supporting carrier comprising a main body portion and a pair of attaching members, said body portion having a part providing a bearing for the cross rod and having another part providing a guideway for the attaching members whereby the attaching members are slidable away from each other adapted thereby to engage opposite wall portions of a doll head for retaining the carrier rigidly in position within the doll head.

3. An eye set comprising a pair of eyes, a cross rod extending between and connecting the eyes, a supporting carrier upon which the cross rod is rotatably mounted, and said supporting carrier comprising a main body portion and a pair of attaching members, said body portion having a part providing a bearing for the cross rod and having another part providing a guideway for the attaching members whereby the attaching members are slidable away from each other, said attaching members each having a plurality of tangs at its outer end, and said attaching members being adapted when slid away from each other to drive said tangs into the material at opposite sides of the doll head for thereby retaining the carrier rigidly in position within the doll head.

4. An eye set comprising a pair of eyes and a supporting carrier therefor upon which the eyes are movably supported, a cross rod extending between and connecting the eyes, means comprised in the carrier serving to pivotally support the cross rod and eyes and to resiliently urge said cross rod and eyes in a direction away from the carrier, the carrier comprising an elongated member extending longitudinally substantially parallel with the cross rod in position rearwardly of the cross rod, and means by which the carrier may be connected by its opposite ends with opposite portions of a doll head at points adjacent the respective eyes.

5. An eye set comprising a pair of eyes, a cross rod connecting said eyes and upon which the eyes are rotatably and longitudinally adjustable, a supporting carrier for said eyes comprising an elongated body member spaced rearwardly of the cross rod and extending longitudinally parallel therewith, said body member having a part intermediate its length constituting a pivot bearing for the cross rod, gravity acting means to oscillate the cross rod in said pivot bearing, and means at the opposite ends of said body member movable thereon to engage opposite wall portions of a doll head for thereby rigidly connecting the carrier within the doll head.

6. An eye set comprising a pair of eyes, a cross rod extending between and connecting said eyes together, and a supporting carrier for said eyes, said carrier comprising a part by which to connect it with a doll head and having another part providing a pivot bearing for the cross rod, said last mentioned part consisting of a pair of bifurcated arms spaced apart, the cross rod extending through the slots provided by the bifurcation of said arms, the parts of the arms at opposite sides of said slots being turned slightly toward each other at their outer ends so that said slots are open ended to permit assembly of the cross rod thereinto and so that said slots are reduced at their open ends to a width less than the diameter of the cross rod, and the parts of said arms at the opposite sides of said slots being resilient to thereby permit said parts to spread for permitting forced entry of the cross rod through the reduced portions of the slots during assembly of the cross rod into the slots.

7. An eye set comprising a pair of eyes, a cross rod extending between and connecting said eyes together, a supporting carrier for said eyes, said carrier comprising a part formed of sheet metal bent to constitute a guideway, a pair of attaching members longitudinally slidable in said guideway adapted to be projected beyond the ends of said guideway into engagement with a doll head to hold the carrier rigidly in position within the doll head, and a part of said sheet metal being arranged to provide a bearing for the cross rod.

8. An eye set comprising a pair of eyes, a cross rod extending between and connecting said eyes together, a supporting carrier for said eyes, said carrier comprising a part formed of sheet metal bent to constitute a guideway, attaching members longitudinally slidable along said guideway into engagement with a doll head to hold the carrier rigidly in position within the doll head, a part of the sheet metal being arranged to provide a pair of bifurcated arms thereon spaced apart, the cross rod extending through the slots provided by the bifurcation of said arms, and spring means engaging the cross rod to resiliently urge the cross rod in one direction along said slots.

9. In an eye set comprising a pair of eyes and a supporting carrier therefor upon which the eyes are movably supported, a cross rod extending between and connecting the eyes together, and resilient means engaging the cross rod to resiliently urge the eyes against their seats in a doll head, the combination therewith of attaching means comprised in said carrier adapted to engage the doll head at points adjacent the eye seats respectively to thereby attach the eye set within the doll head.

10. An eye set comprising a pair of eyes, a cross rod to the opposite end portions of which the eyes are connected, a supporting carrier comprising an elongated member arranged with its opposite ends adjacent the eyes respectively, means upon the carrier intermediate its ends providing a bearing with which the intermediate portion of the cross rod engages, and means at the opposite ends of the carrier adapted for connecting the carrier to a doll head.

11. An eye set comprising a pair of eyes, a cross rod to the opposite end portions of which the eyes are connected, a supporting carrier comprising an elongated member arranged with its opposite ends adjacent the eyes respectively, means upon the carrier intermediate its ends providing a bearing with which the intermediate portion of the cross rod engages, and means at the opposite ends of the carrier slidably mounted thereon to move into engagement with portions of a doll head adjacent the respective eyes for thereby connecting the carrier to the doll head.

12. An eye set comprising a pair of eyes, a carrier for said eyes, said carrier comprising a pair of attaching members movable sidewise thereon in opposite directions away from each other for engaging opposed wall portions spaced frontally of the doll head to attach the carrier in position within the doll head, and said carrier comprising also means adapted to engage the doll head for thereby defining the position of the carrier preparatory for movement of said attaching members to attaching position.

13. An eye set comprising a pair of eyes, a carrier for said eyes, said carrier comprising a body portion and a pair of attaching members spaced apart thereon and movable in opposite directions away from each other into engagement with opposed side wall portions spaced frontally of the doll head for attaching the carrier in position within the doll head, and said body portion having a part intermediate said attaching members adapted to engage a portion rigid with the doll head for thereby defining the position of the carrier preparatory for movement of said attaching members to attaching position.

14. The combination with a doll head having the usual eye openings therethrough, of an eye set comprising a pair of eyes adapted to register with said openings, a carrier for said eyes comprising means by which the eyes are pivotally supported, said carrier also comprising attaching means movable sidewise in opposite directions into the side walls of the doll head by which it may be fixed in position within the head, and said carrier further comprising means arranged to engage a part rigid with the doll head for thereby defining the position of the carrier preparatory for operation of the attaching means.

15. In an eye set comprising a pair of eyes, a carrier for the eyes including means by which to fix the carrier within a doll head, means whereby the eyes are pivotally supported, and spring means interengaging between the eyes and the carrier for urging the eyes in one direction with respect to the carrier to hold the eyes resiliently against the eye openings of the doll head, the combination therewith of means also comprised in the carrier for engaging a part fixed rigid with the doll head adapted thereby to define the position of the carrier within the doll head and to prevent excessive pressure of said spring means against the eyes.

16. The combination with a doll head having the usual eye sockets in its front wall, of an eye set comprising a pair of eyes, and a carrier for said eyes, said carrier having a part of itself arranged to engage the head for limiting the carrier against forward movement toward said eye sockets, said carrier also comprising a pair of attaching members, and said carrier further comprising means whereby the attaching members are connected therewith providing for movement of the attaching members in opposite directions away from each other into engagement with spaced parts of the doll head to thereby fix the carrier in the position as determined by said limiting part.

17. The combination with a doll head having the usual eye sockets in its front wall, of an eye set comprising a pair of eyes, and a carrier for said eyes, said carrier having a part of itself arranged to engage the head for limiting the carrier against forward movement toward said eye sockets, said carrier also comprising means whereby the eyes are pivotally mounted upon the carrier and by which the eyes are yieldingly urged against the eye sockets of the head, said carrier also comprising a pair of attaching members, and said carrier further comprising means whereby the attaching members are connected therewith providing for independent movement of the attaching members thereon into engagement with the doll head to thereby fix the carrier in the position as determined by said limiting part.

18. The combination with a doll head having front and rear walls and having the usual eye sockets in its front wall and having a rearwardly facing wall portion, of an eye set comprising a pair of eyes to be movable in said sockets, and a carrier for said eyes, said carrier having a part of itself arranged to engage the rearwardly facing wall portion of the head for limiting the carrier against forward movement toward said eye sockets, said carrier also comprising means whereby the eyes are pivotally mounted upon the carrier and by which the eyes are yieldingly urged against the eye sockets of the head, said carrier also comprising attaching means by which to fix the carrier in the position as determined by said limiting part, said attaching means being of a character to be impaled in the material of the doll head by movement with respect to the doll head in a direction transverse to a straight line between the front and rear walls of the head.

19. The combination with a doll head having the usual eye sockets in its front wall and having a rearwardly facing wall portion, of an eye set comprising a pair of eyes to be movable in said sockets, and a carrier for said eyes, said carrier having a part of itself facing in one direction to engage the rearwardly facing wall portion of the head to thereby limit movement of the carrier toward said eye sockets, and said carrier also comprising attaching means slidable relative to the head in a direction transverse to the direction in which said first mentioned part faces adapted thereby to engage the head and retain the carrier in the position determined by said limiting part.

20. The combination with a doll head having the usual eye sockets in its front wall and having a rearwardly facing wall portion, of an eye set comprising a pair of eyes to be movable in said sockets, and a carrier for said eyes, said carrier having a part of itself facing in one direction to engage the rearwardly facing wall portion of the head to thereby limit movement of the carrier toward said eye sockets, and said carrier having a part movable in a direction transverse to the direction in which said first mentioned part faces of a character to be impaled in the material of the doll head by movement relative to the head in said transverse direction serving thereby as retaining means for the carrier, and means resiliently supporting the eye set in said carrier.

21. The combination with a doll head having the usual eye sockets in its front wall and having rearwardly facing wall portions spaced apart, of an eye set comprising a pair of eyes to be movable in said sockets, and a carrier for said eyes, said carrier having spaced parts of itself facing in a common direction disposed to engage the rearwardly facing portions of the head to thereby limit movement of the carrier toward said eye sockets, and said carrier also comprising a means which is movable outwardly relative to the center of said carrier and relative to the head in a direction transverse to the direction in which said first mentioned parts of the carrier face adapted thereby to engage the head and serve as a retaining means for the carrier.

22. An eye set comprising a pair of eyes, a supporting carrier for said eyes, said carrier comprising a body portion and a pair of attaching members fitted with a friction fit on said body portion and slidable in opposite directions on said body portion, said attaching members being forcibly slidable away from each other adapted thereby to engage opposite wall portions of the doll head for retaining the carrier rigidly in position within the doll head, means extending between and connecting the eyes together for movement in unison, and means resiliently supporting said connecting means and eyes on said supporting carrier.

23. An eye set comprising a pair of eyes, a supporting carrier for said eyes, said carrier comprising a central body portion and a pair of attaching members fashioned out of sheet metal and fitted onto said body portion, the central body portion forming a guideway for said attaching members and said attaching members being slidable in opposite directions away from each other on said body portion adapted thereby to engage opposite wall portions of the doll head for retaining the carrier rigidly in position within the doll head, means extending between and connecting the eyes together for movement in unison, and means resiliently supporting said connecting means and eyes on said supporting carrier.

24. An eye set comprising a pair of eyes, a supporting carrier for said eyes, said carrier comprising a body portion adapted to extend centrally horizontally across the interior of a doll head and a pair of attaching members fitted on said body portion, said attaching members being provided at their outer ends with tangs, said attaching members being slidable in opposite directions on said body portion away from each other adapted thereby to cause the tangs thereof to engage opposite wall portions of the doll head for retaining the carrier rigidly in position within the doll head, means connecting the eyes together for movement in unison, and means for resiliently mounting said connecting means on said carrier including a resilient bearing for said connecting means located centrally of said carrier.

25. An eye set comprising a pair of eyes, a supporting carrier for said eyes, said carrier comprising a central portion adapted to extend horizontally across the interior of a doll head and a pair of attaching members frictionally fitted with a force fit on said central portion, each of said attaching members being fashioned out of sheet metal and being provided at its outer end with a plurality of tangs spaced by a cut-away portion, said attaching members being slidable in opposite directions on said central portion away from each other adapted thereby to cause the tangs thereof to engage opposite wall portions of the doll head for retaining the carrier rigidly in position within the doll head, and means connecting the eyes together for movement in unison supported on said carrier.

26. An eye set comprising a pair of eyes, a supporting carrier for said eyes, said carrier comprising a body portion and a pair of attaching members fitted with a sliding fit on said body portion and slidable in opposite directions on said body portion away from each other adapted thereby to engage opposite wall portions of the doll head for retaining the carrier rigidly in position within the doll head, means extending between and connecting the eyes together for movement in unison, and means for resiliently mounting said connecting means on said carrier including a resilient bearing for said connecting means located centrally of said carrier and effective for yieldingly urging said eyes toward the eye sockets of the doll head.

27. An eye set for a doll head comprising a pair of eyes, a carrier for said eyes, said carrier comprising attaching means movable sidewise of the doll head in opposite directions away from each other into side wall portions spaced frontally of the doll head by which the said carrier may be attached in position within the doll head, and said carrier also comprising spaced parts adapted to engage spaced parts of the doll head for thereby defining the position of the carrier preparatory to attaching the carrier in position by said attaching means.

In testimony whereof I affix my signature.

ALEXANDER KONOFF.